US010609528B2

(12) United States Patent
Doggart et al.

(10) Patent No.: US 10,609,528 B2
(45) Date of Patent: Mar. 31, 2020

(54) VEHICLE COMMUNICATION SYSTEM AND METHOD

(71) Applicant: JAGUAR LAND ROVER LIMITED, Coventry, Warwickshire (GB)

(72) Inventors: Peter Doggart, Warwickshire (GB); Matt Reed, Warwickshire (GB); Ken Loveday, Warwickshire (GB)

(73) Assignee: JAGUAR LAND ROVER LIMITED, Warwickshire (GB)

( * ) Notice: Subject to any disclaimer, the term of this patent is extended or adjusted under 35 U.S.C. 154(b) by 0 days.

(21) Appl. No.: 16/315,926

(22) PCT Filed: Jun. 30, 2017

(86) PCT No.: PCT/EP2017/066290
§ 371 (c)(1),
(2) Date: Jan. 7, 2019

(87) PCT Pub. No.: WO2018/007254
PCT Pub. Date: Jan. 11, 2018

(65) Prior Publication Data
US 2019/0306680 A1 Oct. 3, 2019

(30) Foreign Application Priority Data
Jul. 8, 2016 (GB) .................................. 1611914.1

(51) Int. Cl.
*H04W 4/46* (2018.01)
*H04W 4/50* (2018.01)
(Continued)

(52) U.S. Cl.
CPC ................ *H04W 4/46* (2018.02); *G08G 1/22* (2013.01); *H04L 67/12* (2013.01); *H04L 67/18* (2013.01);
(Continued)

(58) Field of Classification Search
CPC ........... H04W 4/00; H04W 4/30; H04W 4/40; H04W 4/44; H04W 4/46; H04W 4/50
See application file for complete search history.

(56) References Cited

U.S. PATENT DOCUMENTS 6,282,468 B1 8/2001 Tamura
2009/0079839 A1 3/2009 Fischer et al.
(Continued)

FOREIGN PATENT DOCUMENTS

EP 1681663 7/2006
EP 2390744 11/2011
(Continued)

OTHER PUBLICATIONS

International Search Report and Written Opinion, PCT/EP2017/066290, dated Dec. 11, 2017, 16 pp.
(Continued)

*Primary Examiner* — Blane J Jackson
(74) *Attorney, Agent, or Firm* — Miller Nash Graham & Dunn LLP

(57) ABSTRACT

A method of managing a vehicle convoy, the method comprising: sending a convoy setup invitation message from a first vehicle to set up a vehicle convoy; receiving, at the first vehicle, a confirmation message from a second vehicle accepting the convoy setup invitation; sending, from the first vehicle, convoy data messages to the second vehicle, the convoy data messages comprising data required to maintain the vehicle convoy.

14 Claims, 6 Drawing Sheets

(51) Int. Cl.
  *H04W 76/14* (2018.01)
  *G08G 1/00* (2006.01)
  *H04W 4/08* (2009.01)
  *H04W 40/22* (2009.01)
  *H04L 29/06* (2006.01)
  *H04L 29/08* (2006.01)
(52) U.S. Cl.
  CPC ............... *H04L 67/42* (2013.01); *H04W 4/08* (2013.01); *H04W 40/22* (2013.01); *H04W 76/14* (2018.02); *B60W 2550/408* (2013.01)

(56) References Cited

U.S. PATENT DOCUMENTS

| | | |
|---|---|---|
| 2010/0177703 A1 | 7/2010 | daCosta et al. |
| 2013/0120159 A1 | 5/2013 | Staehlin et al. |
| 2014/0278027 A1* | 9/2014 | Burke ..................... G08G 1/22 701/117 |
| 2015/0081157 A1* | 3/2015 | Banasky, Jr. ...... G01C 21/3438 701/29.1 |
| 2015/0127189 A1 | 5/2015 | Mehr et al. |
| 2016/0198315 A1 | 7/2016 | Sakata |
| 2019/0069236 A1* | 2/2019 | Alieiev ............. H04W 52/0206 |
| 2019/0306678 A1* | 10/2019 | Byun .................... H04W 76/23 |

FOREIGN PATENT DOCUMENTS

| | | |
|---|---|---|
| WO | 2014051473 | 4/2014 |
| WO | 2016159712 | 10/2016 |

OTHER PUBLICATIONS

Search and Examination Report, GB1611914.1, dated Jan. 6, 2017, 9 pp.

Search and Examination Report, GB1710501.6, dated Dec. 14, 2017, 5 pp.

* cited by examiner

VEHICLE COMMUNICATION SYSTEM AND METHOD

CROSS-REFERENCE TO RELATED APPLICATIONS

This application is a 371 of International Application No. PCT/EP2017/066290, filed Jun. 30, 2017, which claims priority to GB Patent Application 1611914.1, filed Jul. 8, 2016, the contents of both of which are incorporated by reference herein in their entirety.

TECHNICAL FIELD

The present disclosure relates to a vehicle communication system and method and particularly, but not exclusively, to a method of managing a vehicle convoy. Aspects of the invention relate to a vehicle convoy management system on a first vehicle for managing a vehicle convoy, to a vehicle convoying method for a vehicle participating in a vehicle convoy, to a vehicle convoying system for a vehicle participating in a vehicle convoy, to a message broadcasting method and system for a first vehicle within a vehicle convoy and to a vehicle.

BACKGROUND

Intelligent transport systems (ITS) are vehicle and infrastructure applications which enable transport modes and traffic management activities to be performed within a vehicle network. The technologies used in an intelligent transport system may vary from the basic (e.g. navigation systems, speed cameras, number plate recognition) to more advanced systems which integrate multiple data and feedback sources and cooperative systems such as vehicle to vehicle communication (V2V) and vehicle to infrastructure communication (V2I) via wireless communications networks.

The present deployment of intelligent transport systems is fairly limited. It is also noted that the applications of such systems are generally restricted to road management and road safety applications. In particular, present solutions do not offer the ability of multiple vehicles in convoy situations to communicate effectively with one another.

It is an aim of the present invention to address disadvantages associated with the prior art.

SUMMARY OF THE INVENTION

According to an aspect of the present invention there is provided a method of managing a vehicle convoy, the method comprising: sending a convoy setup invitation message from a first vehicle to set up a vehicle convoy; receiving, at the first vehicle, a confirmation message from a second vehicle accepting the convoy setup invitation; sending, from the first vehicle, convoy data messages to the second vehicle, the convoy data messages comprising data required to maintain the vehicle convoy.

The present invention provides a mechanism for creating a vehicle convoy comprising the exchange of setup and confirmation messages and then the further exchange of messages comprising data required to maintain the convoy.

The convoy invitation message may be sent via multiple communication channel options such as a mobile telecommunications network (e.g. a 2G/3G/4G or LTE network) or via a direct vehicle-to-vehicle broadcast system.

The mobile telecommunications network may be an LTE-V network or may be LTE Direct.

The convoy invitation message may be sent via a vehicle-to-vehicle broadcast system, such as a dedicated short range communication channel.

The confirmation message may comprise an indication of a preferred communication channel for receiving convoy data messages. It is noted that the convoy setup invitation message may be sent over all available communication channel options available to the first vehicle. The confirmation message may be sent back to the first vehicle via all communication channel options available to the replying vehicle or alternatively the confirmation message may be sent according to a preferred communication option list sent by the first vehicle (for example, the first vehicle may specify "use a dedicated short range communication channel (DSRC) if available, or a mobile telecommunications network if DSRC not available).

The convoy data messages may comprise vehicle data from a communications network (e.g. a controller area network (CAN), FlexRay network, MOST network, LIN network etc) within the vehicle.

The convoy data messages may comprise vehicle configuration settings for the first vehicle. Vehicle configuration settings may comprise wade data and the wade data may comprise the depth of recent wading events. Further, the vehicle configuration settings may comprise the wading configuration of the first vehicle.

Vehicle configuration settings may also comprise terrain mode configuration settings, speed selected by a vehicle control system, the ride height selected by the first vehicle, vehicle wheel articulation, wheel slip, control speed of a vehicle, changes in control speed of a vehicle and prepared navigational routes for the vehicles in the convoy to follow. It is noted that some, any or all of the above noted configuration settings may be sent in the convoy data messages.

Convoy data messages may comprise one of more selected from: terrain response configuration of the first vehicle; control speed data of the first vehicle; control speed variation data of the first vehicle; wade data; wheel articulation data; wheel slip data; GPS data; tire pressure data.

Convoy data messages may comprise multimedia content such as video and/or audio content.

The first vehicle may broadcast a vehicle status message, the status message comprising a standard element for notifying the surrounding environment of the status of the first vehicle and a customised element, the customised element comprising the convoy data message.

The method may comprise receiving convoy data messages from the second vehicle.

The method may comprise sending convoy setup invitation messages to and receiving confirmation messages from a plurality of vehicles.

The method may comprise sending convoy data messages to and receiving convoy from a plurality of vehicles, wherein convoy data messages comprise a communication status indication, the communication status indication providing an indication of the various communication channels available to the vehicle sending the convoy data message.

In the event that the first vehicle does not have mobile telecommunications network as an available communication channel, the method may comprise: analysing, at the first vehicle, received convoy data messages to identify the availability of a mobile telecommunications network in an identified vehicle in the convoy; sending a convoy data message from the first vehicle with a request that the convoy data message is to be forwarded from the identified vehicle using the identified mobile telecommunications network.

The vehicle convoy may be an off road convoy and the convoy data messages may comprise data relating to off road driving.

According to a further aspect of the present invention there is provided a vehicle convoy management system on a first vehicle for managing a vehicle convoy, the system comprising: an input/output module arranged to send to and receive messages from other vehicles in the convoy; a processor arranged to: send, via the input/output module, a convoy setup invitation message from a first vehicle to set up a vehicle convoy; receive, via the input/output module, a confirmation message from a second vehicle accepting the convoy setup invitation; send, via the input/output module, convoy data messages to the second vehicle, the convoy data messages comprising data required to maintain the vehicle convoy.

According to a yet further aspect of the present invention there is provided a vehicle convoying method for a vehicle participating in a vehicle convoy, the method comprising: receiving, at the participating vehicle, a convoy setup invitation message from a lead convoy vehicle, the convoy setup invitation message being an invitation to set up a vehicle convoy; sending, from the participating vehicle, a confirmation message accepting the convoy setup invitation; receiving convoy data messages from the lead convoy vehicle, the convoy data messages comprising data required to maintain the vehicle convoy.

According to a still further aspect of the present invention there is provided a vehicle convoying system for a vehicle participating in a vehicle convoy, the system comprising: an input arranged to receive, at the participating vehicle, a convoy setup invitation message from a lead convoy vehicle; a processor arranged to generate a confirmation message accepting the convoy setup invitation message; an output arranged to send the confirmation message wherein the input is arranged to receive convoy data messages from the lead convoy vehicle, the convoy data messages comprising data required to maintain the vehicle convoy.

According to another aspect of the present invention there is provided a message broadcasting method from a first vehicle within a vehicle convoy, the method comprising: receiving, via a first communications channel, a convoy data message from a second vehicle in the vehicle convoy, the convoy data message comprising a communication status indication providing an indication of the various communication channels available to the second vehicle within convoy; determining, at the first vehicle, that a second communication channel is unavailable; analysing, at the first vehicle, the received convoy data message to identify the availability of the second communications channel in the second vehicle in the convoy; sending, from the first vehicle, a convoy data message via the first communications channel with a request that the convoy data message is to be forwarded from the second vehicle using the second communications channel.

Optionally, the convoy data messages comprise vehicle data from a communications network within the first or second vehicle.

Optionally, the convoy data messages comprise vehicle configuration settings for the first vehicle. The vehicle configuration settings may comprise wade data. Optionally, wade data comprises the depth of recent wading events. The vehicle configuration settings may comprise the wading configuration of the first vehicle. The vehicle configuration settings may comprise terrain mode configuration settings.

Optionally, the convoy data messages comprise one of more selected from: terrain response configuration of the first vehicle; control speed data of the first vehicle; control speed variation data of the first vehicle; wade data; wheel articulation data; wheel slip data; GPS data; tire pressure data.

The convoy data messages may comprise multimedia content.

Optionally, the first vehicle broadcasts a vehicle status message, the status message comprising a standard element for notifying surrounding environment of status of vehicle and a customised element, the customised element comprising the convoy data message.

Optionally, the method comprises sending convoy setup invitation messages to and receiving confirmation messages from a plurality of vehicles.

Optionally, the vehicle convoy is an off road convoy and the convoy data messages comprise data relating to off road driving.

According to yet another aspect of the present invention there is provided a message broadcasting system from a first vehicle within a vehicle convoy, the system comprising: an input arranged to receive, via a first communications channel, a convoy data message from a second vehicle in the vehicle convoy, the convoy data message comprising a communication status indication providing an indication of the various communication channels available to the second vehicle within convoy; a processor arranged to determine, at the first vehicle, that a second communication channel is unavailable and to analyse, at the first vehicle, the received convoy data message to identify the availability of the second communications channel in the second vehicle in the convoy; an output arranged to send, from the first vehicle, a convoy data message via the first communications channel with a request that the convoy data message is to be forwarded from the second vehicle using the second communications channel.

Preferred features of the first aspect of the present invention apply to the further aspects of the invention detailed above.

The systems described above may comprise means for receiving one or more convoy data messages and may comprise an electronic processor having an electrical input for receiving said one or more messages each indicative of data required to maintain the convoy. The systems may comprise an electronic memory device electrically coupled to the electronic processor and having instructions stored therein.

According to a further aspect of the present invention there is provided a non-transitory computer-readable medium tangibly embodying computer-executable instructions for operating a controller of a motor vehicle, the instructions being executable by a vehicle processor to provide operations comprising: sending a convoy setup invitation message from a first vehicle to set up a vehicle convoy; receiving, at the first vehicle, a confirmation message from a second vehicle accepting the convoy setup invitation; sending, from the first vehicle, convoy data messages to the second vehicle, the convoy data messages comprising data required to maintain the vehicle convoy.

According to a further aspect of the present invention there is provided a non-transitory computer-readable medium tangibly embodying computer-executable instructions for operating a controller of a motor vehicle, the instructions being executable by a vehicle processor to provide operations comprising: receiving, at the participating vehicle, a convoy setup invitation message from a lead convoy vehicle, the convoy setup invitation message being an invitation to set up a vehicle convoy; sending, from the participating vehicle, a confirmation message accepting the convoy setup invitation; and receiving convoy data messages from the lead convoy vehicle, the convoy data messages comprising data required to maintain the vehicle convoy.

According to a further aspect of the present invention there is provided a non-transitory computer-readable medium tangibly embodying computer-executable instructions for operating a controller of a motor vehicle, the instructions being executable by a vehicle processor to provide operations comprising: receiving, via a first communications channel, a convoy data message from a second vehicle in the vehicle convoy, the convoy data message comprising a communication status indication providing an indication of the various communication channels available to the second vehicle within convoy; determining, at the first vehicle, that a second communication channel is unavailable; analysing, at the first vehicle, the received convoy data message to identify the availability of the second communications channel in the second vehicle in the convoy; sending, from the first vehicle, a convoy data message via the first communications channel with a request that the convoy data message is to be forwarded from the second vehicle using the second communications channel.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

The aim of cooperative systems is to use the available sensor information available on vehicles and infrastructure to increase road safety. Within the European Telecommunication Standards Institute (ETSI) standard EN 302 637-2, cooperative awareness messages (CAM) are exchanged which carry information that may be relevant to other vehicles (and infrastructure) on the road network. CAM messages may include a variety of information including vehicle heading, speed, dimensions, acceleration and location. In the US the SAE J2735 standard references basic safety messages (BSMs) which carry similar data.

Additionally the ETSI standard EN 302 637-3 defines decentralised environmental notification messages (DENM) that contain information relating to road hazards or abnormal traffic conditions.

Embodiments of the present invention provide systems and methods for utilising CAM and DENM style messages to supply convoy relevant information between vehicles within a convoy. In particular, embodiments of the present invention may be deployed in off road scenarios where traditional mobile telephone network communications may be difficult or may be subject to interference and drop outs.

Figure 1:
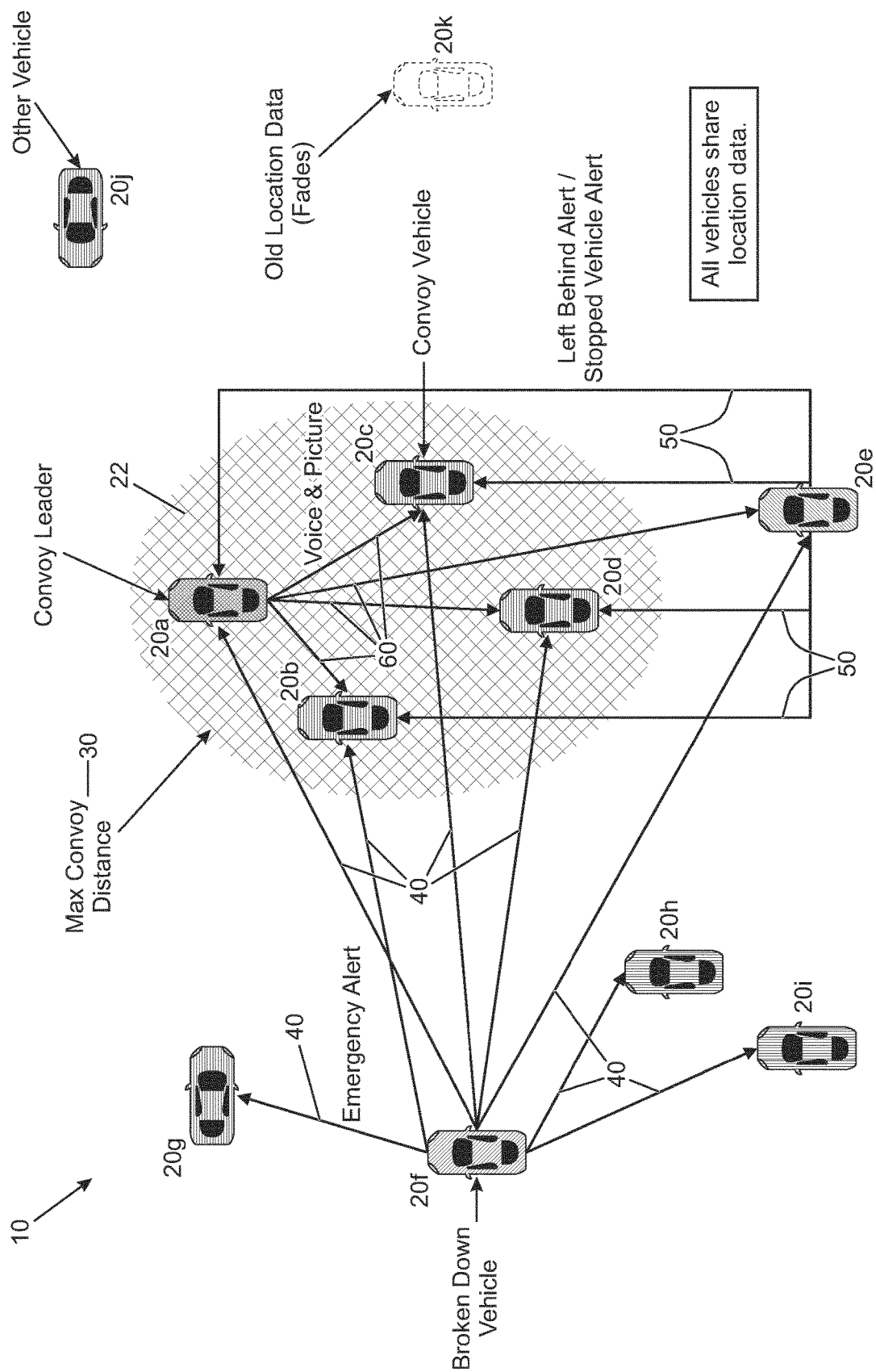
FIG. 1 shows a vehicle convoy comprising multiple vehicles according to an embodiment of the present invention.

FIG. 1 shows a convoy comprising multiple vehicles. Embodiments of the present invention may be deployed into such environments as described below.

Turning to FIG. 1, a driving environment 10 is shown which comprises a number of vehicles 20a-20k. Vehicles 20a, 20b, 20c, 20d and 20e are part of a convoy 22 of vehicles within which vehicles 20a-20d are currently travelling within a predefined maximum convoy distance 30 from one another and vehicle 20e has dropped off the back of the convoy (e.g. because it has stopped or broken down).

Vehicle 20f is outside the convoy area 30 and is broken down. Other vehicles 20g, 20h, 20i and 20j are shown in the driving environment. Vehicle 20k represents an out of date location for a vehicle and is in the process of fading from the view shown in FIG. 1 as the data is old.

A number of data communication channels/links are shown between the various vehicles. Data communications 40 are shown originating from the broken down vehicle 20f. These are emergency alert notification messages.

Data communications 50 are shown originating from vehicle 20e that has fallen out of the convoy zone 30. These messages comprise "left behind" alerts/stopped vehicle alerts to the remaining vehicles in the convoy.

Data communications are shown originating from vehicle 20a, the convoy leader, to the remaining vehicles 20b, 20c and 20d in the convoy via communications channels 60. These messages comprise convoy messages ("convoy data messages") to the other convoy vehicles and may comprise multimedia messages (such as voice and picture messages) along with data such as terrain response configuration settings for vehicle 20a, control speed data; control speed variation data, wade data, vehicle wheel articulation data, wheel slip data, location data, tire pressure information etc. For clarity within FIG. 1, only communications originating from vehicle 20a are shown though it is to be appreciated that each of the vehicles in the convoy may be sending similar communications to the other vehicles.

Communication is shown occurring directly between the vehicles for illustration purposes. However it is to be noted that the communications may be direct in the sense that they propagate through the convoy only, e.g. by using a Dedicated Short Range Communication (DSRC) system or equivalent, or may be indirect in the sense that they leave the convoy before returning to another vehicle, e.g. via a cloud/server based system using a mobile telephone network.

Dedicated Short Range Communications are short range (up to around 1 km line of sight and less for non line of sight applications) wireless communications channels that have been specifically designed for use in automotive applications such as intelligent transportation systems.

It is also noted that the long term evolution (LTE) wireless communications standard may be used to effect communications directly between vehicles. The LTE Direct technology is a device to device technology that uses the LTE spectrum and infrastructure. LTE-V is an LTE based technology which offers similar functionality to DSRC (referred to previously) using existing mobile technologies and infrastructure. Under the appropriate conditions both LTE-D and LTE-V may allow direct communication between vehicles, although it may be necessary in some instances to set up such a link with the assistance of a mobile telecommunications network base station.

Known mobile telecommunications networks (e.g. 2G, 3G, 4G) may also be used in order to route messages from a vehicle to a cloud/server based system. Vehicles may either be equipped with SIM devices to enable such communications to take place or may be in communication with on-board mobile devices (e.g. the driver's mobile device) which can relay messages from the vehicle to the cloud based system.

Figure 2:
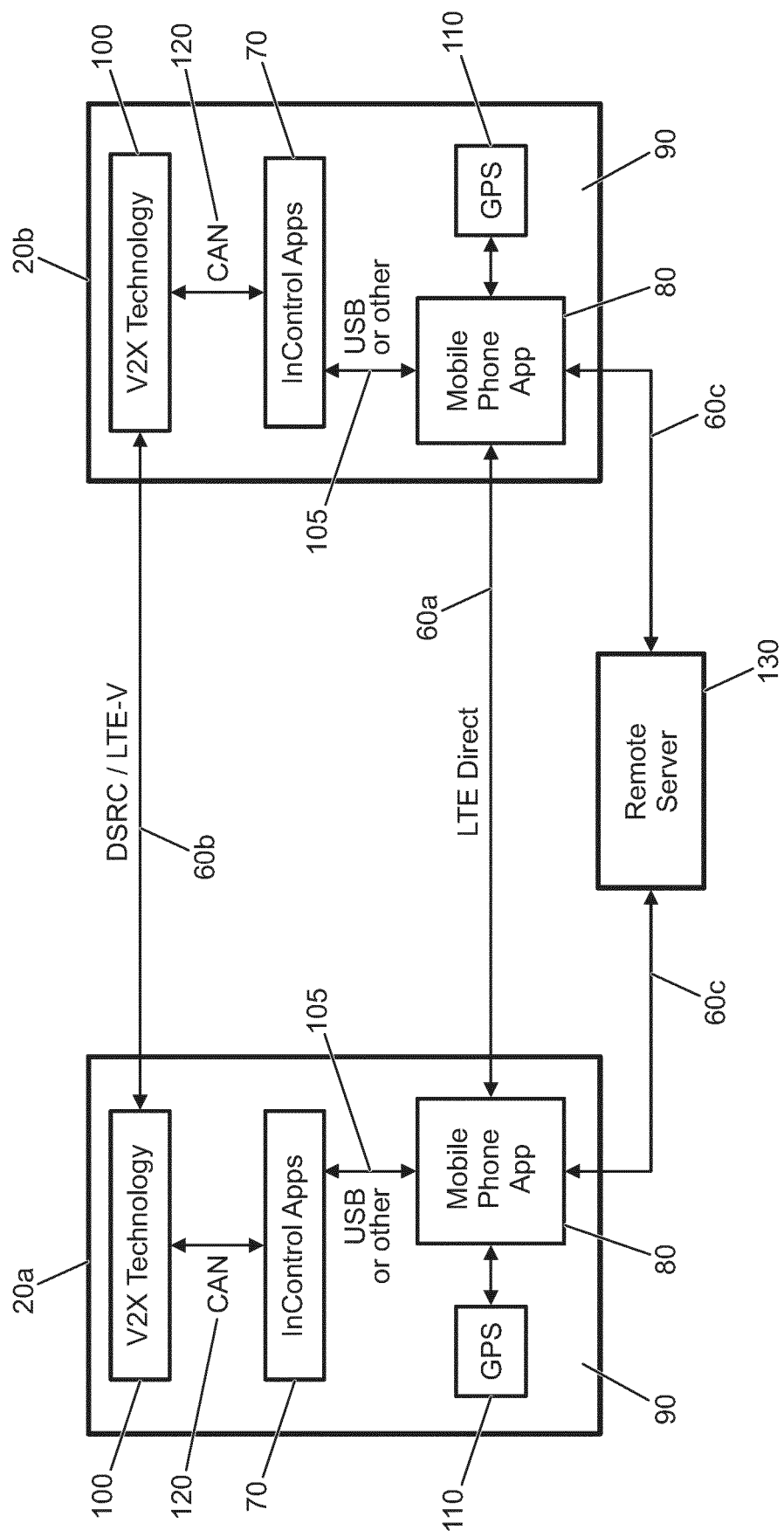
FIG. 2 shows the systems on board two of the vehicles in FIG. 1 in more detail.

FIG. 2 shows the systems on board two of the vehicles, 20a and 20b, from FIG. 1 in more detail. Like features within the figures are denoted by like reference numerals. It is noted that the communications channels 60 shown in FIG. 1 have been sub-divided into channels 60a, 60b and 60c as described below.

Each vehicle comprises communications means in the form of a computer application 70 (labelled as "Computer Apps" in FIG. 2) that enables the vehicle to connect to the outside world. The application 70 may either interact with a mobile phone application 80 within a mobile device 90 with the vehicle or may interact with an intelligent travel system communication module 100 (shown as V2X technology in FIG. 2).

The mobile device 90 may, for example, be the driver's mobile device which may connect to the computer application 70 via a wired (e.g. USB) or wireless (e.g. Bluetooth®) connection 105. The mobile device 90 may incorporate a location determining means 110 in the form of a GPS unit such that the location of the device 90, and therefore the vehicle may be determined. It is also noted that the vehicle may comprise its own mobile device 90 instead of requiring the use of the driver's mobile device.

Communications 60a between vehicles 20a and 20b may be enabled via the mobile devices 90 using the LTE Direct system. Such a communication channel/path would require SIM enabled devices to be in communication with the computer application 70 in order to be able to set up the LTE Direct link. It is noted that additionally the LTE Direct link may need to be initiated via a mobile base station but that, once up and running, a direct communication channel/link may be maintained between the vehicles while they are in communication range.

As an alternative (or in addition) to the mobile device 90 based embodiment, it is noted that the vehicles may comprise a direct vehicle to vehicle based system such as the DSRC system noted above or a system based on the LTE-V technology. In such an arrangement the ITS communication module 100 may be in communication with the computer application 70 via an internal communication network within the vehicle. In one embodiment the communication module 100 may be in communication with the computer application via the controller area network (CAN) within the vehicle. The CAN bus is a vehicle bus standard that allows microcontrollers and devices to communicate with each other in applications without a host computer.

Enabling communications via an on-board vehicle network (such as via the CAN bus) has an advantage that vehicle configuration settings may be transmitted, as messages over communications channel 60b, to and from the vehicles 20a and 20b and, in some embodiments, received configuration settings may be used to configure a following vehicle in a convoy (e.g. vehicle 20a as the leader may send wading configuration settings and/or terrain configuration settings to vehicle 20b which is following and vehicle 20b may be automatically configured according to those settings).

As a further alternative (or addition) to the communication routes 60a and 60b described above the mobile devices 90 may communicate with one another via a traditional mobile network communication path 60c, e.g. via a server 130.

Figure 3:
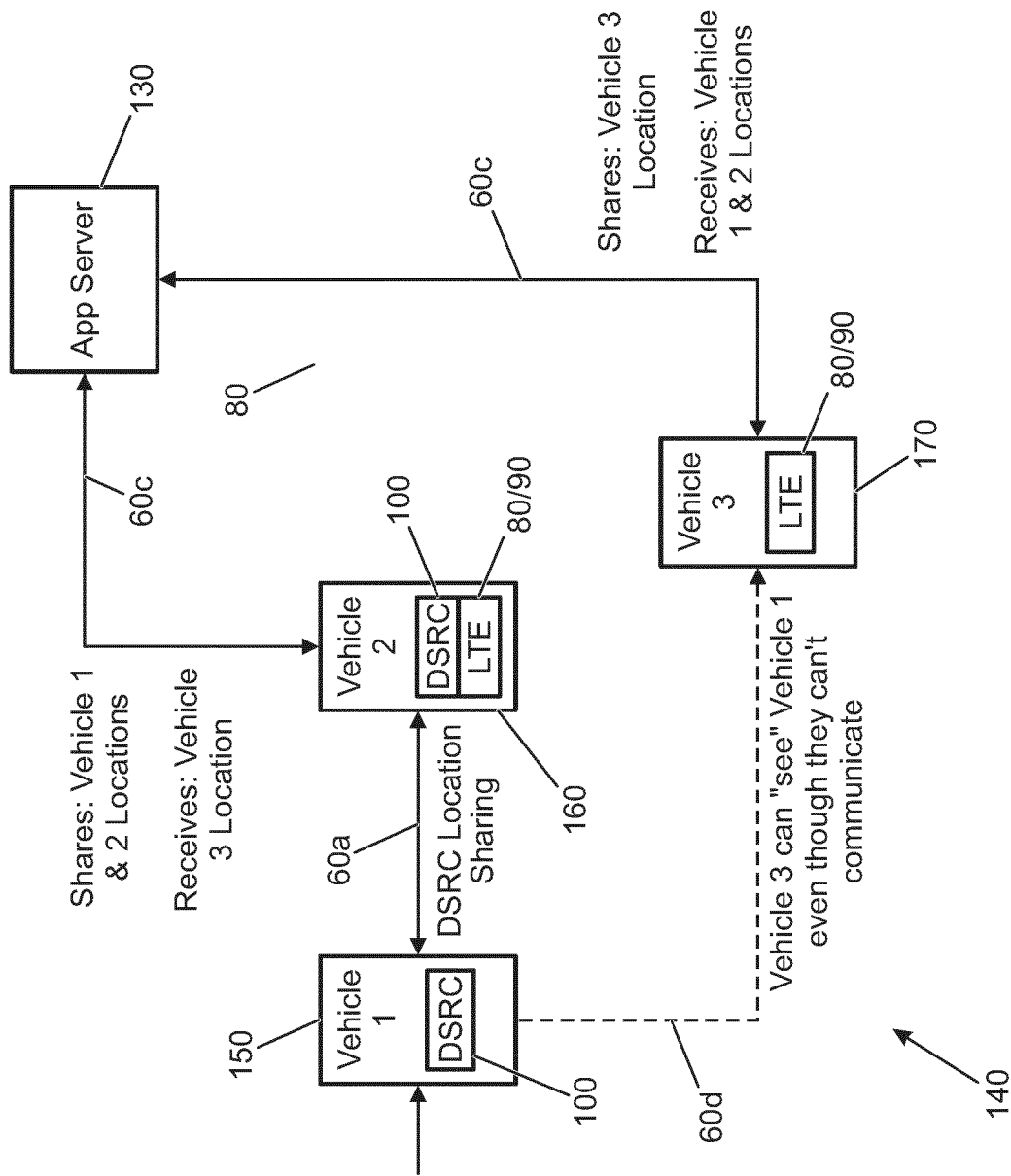
FIG. 3 shows the communication between three vehicles in a further convoy in accordance with an embodiment of the present invention.

FIG. 3 shows the communication between three vehicles in a further convoy embodiment. The embodiment of FIG. 3 shows a further driving environment 140 in which there are three vehicles 150, 160, 170.

Vehicle 150 comprises an intelligent travel system communication module 100. Vehicle 160 comprises an intelligent travel system communication module 100 and also a mobile phone application 80 on a mobile device 90 (i.e. vehicle 160 comprises two communication means 100 and 80). Vehicle 170 comprises a mobile phone application 80 on a mobile device 90 only.

When travelling in a convoy, vehicle 150 and 160 may communicate directly via a DSRC message (60a). Vehicles 160 and 170 communicate via the remote server 130 and the mobile telecommunications messages 60c. Vehicles 150 and 170 are not configured to be able to communicate with one another, however vehicle 170 can effectively "see" vehicle 150 (and vice versa) since vehicle 160 (and remote server 130) effectively forms a bridge between vehicles 150 and 170.

FIG. 3 illustrates the sharing of information via the example of vehicle location. Vehicle 150 shares its location via DSRC message with Vehicle 160. Vehicle 160 in turn can share via server 130 its location and also the location of vehicle 150.

Vehicle 170 therefore receives two vehicle locations (for vehicles 150 and 160). Vehicle 170 may also share, via server 130, its location to vehicle 160. Vehicle 160 in turn may share its location and that of vehicle 170 to vehicle 150 via the DSRC communication route.

Figure 4:
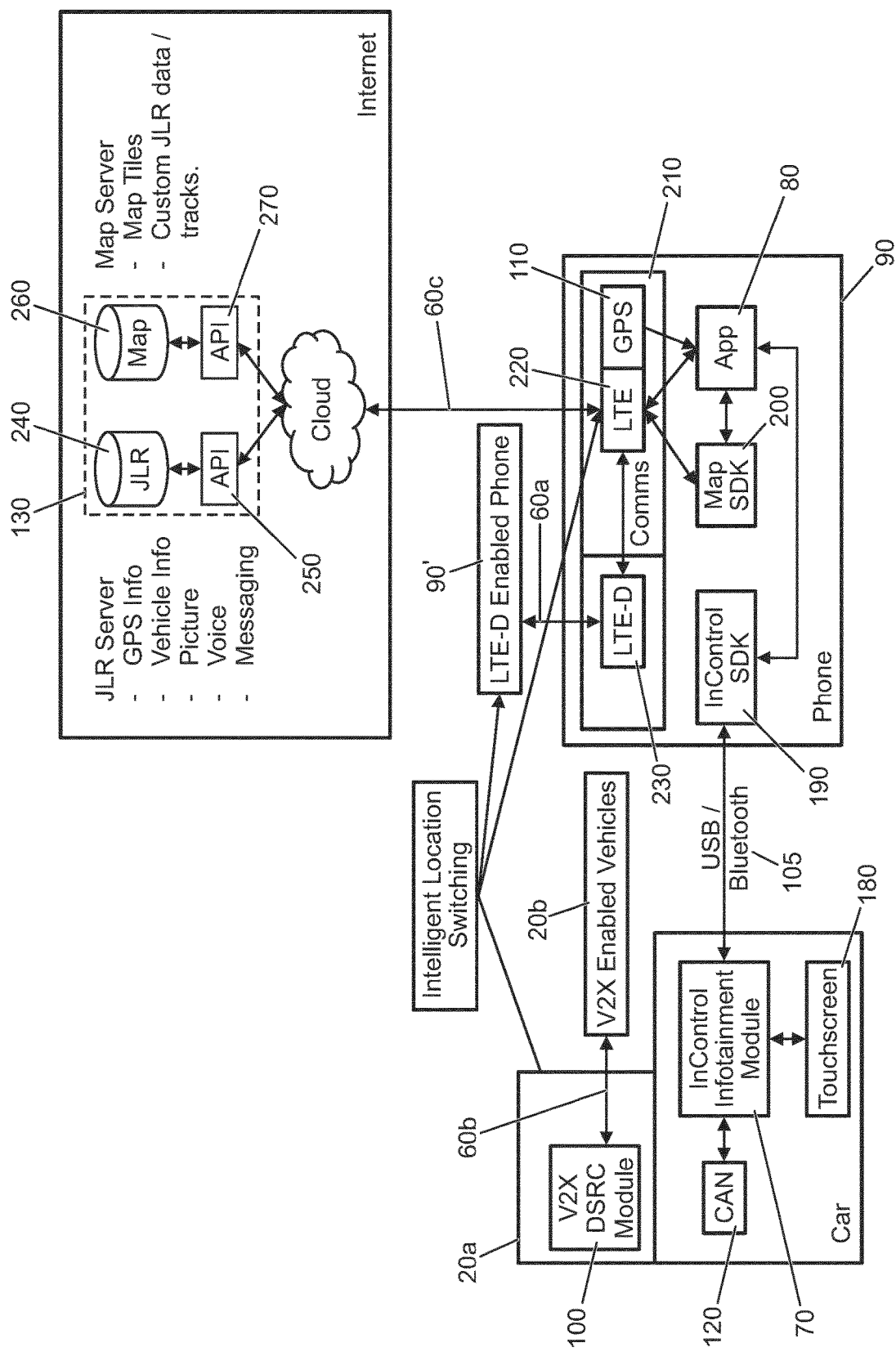
FIG. 4 shows a further system architecture according to an embodiment of the present invention.

FIG. 4 shows a further architecture of a system according to embodiments of the present invention. In FIG. 4 like features compared to FIGS. 1 to 3 are shown by like reference numerals.

In FIG. 4, a vehicle 20a comprises an intelligent travel system communication system 100, a CAN 120 and a computer application 70 as described above. Additionally, the vehicle comprises user input means in the form of a touchscreen 180 from which a user may send instructions relating to the sharing of convoy information and through which the user may receive notifications of convoy information.

Vehicle 20a is in communication with another vehicle 20b comprising a direct vehicle-to-vehicle communication means.

Vehicle 20a also comprises a mobile device 90 which is in communication via either a wired connection (such as USB) or wireless connection (such as Bluetooth®) 105 with the computer application 70. The communication path 105 with the computer application 70 may be via a suitable software development kit interface 190 on the mobile device 90. The interface 190 may in turn communicate within the mobile device with a mobile phone application 80 through which a user may input user commands.

The mobile phone application 80 and a map interface 200 are in communication with communications means 210 in the form of a mobile network module 220 (labelled LTE) and a location determining means, in the form of a GPS module 110. The mobile device 90 shown in FIG. 4 additionally comprises an LTE-Direct communications module 230 which may be configured to communicate directly (communications channel 60a) with other similarly provisioned mobile devices (90').

The mobile network module 220 may communicate via a mobile telecommunications network and the Internet with a remote server 130. As shown in FIG. 4 the remote server comprises two server systems, a vehicle data server 240 which is accessed by its own application programming interface 250, and a location server 260 which is accessed by its own application programming interface 270.

The vehicle data server 240 may be arranged to process and store data such as GPS information, vehicle information, picture data, voice data, messaging data. The map server 260 may be arranged to process and store mapping related data.

Figure 5:
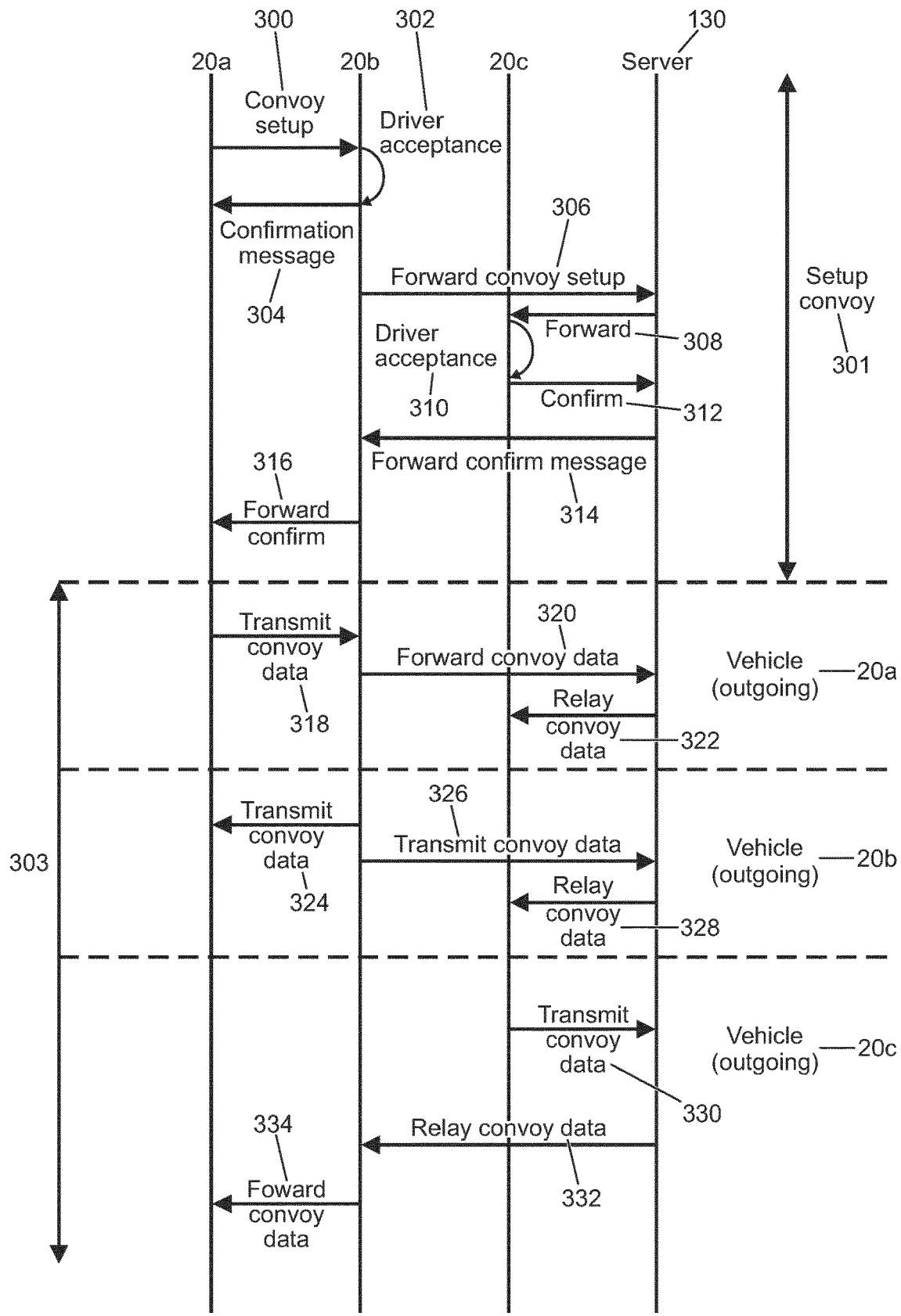
FIG. 5 is a representation of communications messages being sent between the three vehicles of FIG. 2.

FIG. 5 shows a representation of the communications messages being sent between the three vehicles of FIG. 2 during a set up phase 301 and then in a subsequent convoy phase 303.

In FIG. 5 it is assumed that vehicle 20a is the lead vehicle within the convoy. In step 300, an occupant of vehicle 20a starts a convoy creation process by sending a convoy setup invitation message via its communication module 100. The convoy setup message is then sent via the communication channel/route 60a as shown in FIG. 3 and is received by vehicle 20b.

In step 302, the driver (or other occupant) of vehicle 20b accepts the request/offer to set up a convoy. This may comprise entering an identification code or entering a username/password into the vehicle's computer application module 70.

In step 304 a confirmation message is sent back to vehicle 20b via the communication route 60a.

Since vehicle 20a does not comprise a mobile device 90, vehicle 20b in step 306 forwards the convoy setup message to a remote server 130 via a mobile telecommunications network. This forwarded message is sent via the communication channel/path 60c in FIG. 3.

Server 130 in turn forwards the convoy setup invitation message in step 308 to vehicle 20c. In step 310 the driver (or other occupant) of vehicle 20c accepts the convoy setup request and in step 312 sends a confirmation message back to the server 130. The server in turn forwards, in step 314, the confirmation message from vehicle 20c back to vehicle 20b. Finally, vehicle 20b forwards the confirmation message from vehicle 20c back to vehicle 20a to complete the set-up of the three vehicle convoy.

In convoy phase 303 the three vehicles 20a, 20b and 20c are shown sending convoy data messages to each other.

Vehicle 20a is able to send, in step 318, convoy data messages directly to vehicle 20b which, in step 320, forwards the convoy data message to server 130 which then relays the convoy data message in step 322 to vehicle 20c.

Vehicle 20b is able to send, in step 324, convoy data messages directly to vehicle 20a (using its communication module 100). Convoy data messages to vehicle 20c are sent to the server in step 326 using a mobile device 90 (either integrated with the vehicle or belonging to a vehicle occupant). Server 130 relays convoy data message in step 328 to vehicle 20c.

Vehicle 20c is able to transmit, in step 330, convoy data messages to the server 130 via a mobile device 90. The server relays the convoy data message in step 332 to vehicle 20b which in turn, in step 334 forwards the convoy data message to vehicle 20a using its communication module 100.

Vehicle convoy data messages may comprise one or more of, but are not limited to, the following types of information: terrain response configuration for a vehicle, wade data (e.g. depth of recent wading events and/or vehicle wading configuration), GPS data, tire pressure data, vehicle speed, vehicle direction.

The information contained within a vehicle convoy data message may be obtained from the vehicle's internal communications networks, e.g. from the controller area network (CAN).

Where a vehicle receives a convoy data message that comprises configuration data (e.g. terrain response configuration data), the convoy may be configured such that vehicles following the lead vehicle are configured into the same or similar driving settings as the lead vehicle using the information in the convoy data message.

Convoy data messages may be used in any driving environment (e.g. on-road, race track or off-road). In an off road environment the convoy data messages may conveniently be shared with other vehicles in the convoy to aid off-road guidance. In a race track environment the convoy data message may conveniently be shared with other vehicles in the convoy to aid track guidance such as identifying the racing line and measuring the vehicle performance parameters.

As well as convoy data messages sent between vehicles, a convoy arrangement as shown in FIGS. 1 to 5 may comprise the exchange of standard vehicle status messages. The convoy data messages may therefore comprise a customised/bespoke message element compared to the standard message element of the vehicle status messages.

In DSRC arrangements the customised and standard messages may be sent via different computer ports. For example, in DSRC arrangements, the Basic Transport Protocol (BTP), as described in ETSI EN 302 636-5-1 uses predefined communication port numbers for ITS (Intelligent Transport System) facilities layer messages (port 2001 for CAN, port 2002 for DENM, port 2004 for SPAT, etc.). The other non-allocated ports (e.g. 3000) may be used to send customised vehicle to vehicle messages. This customised message may be manufacturer specific and may be encrypted.

Figure 6:
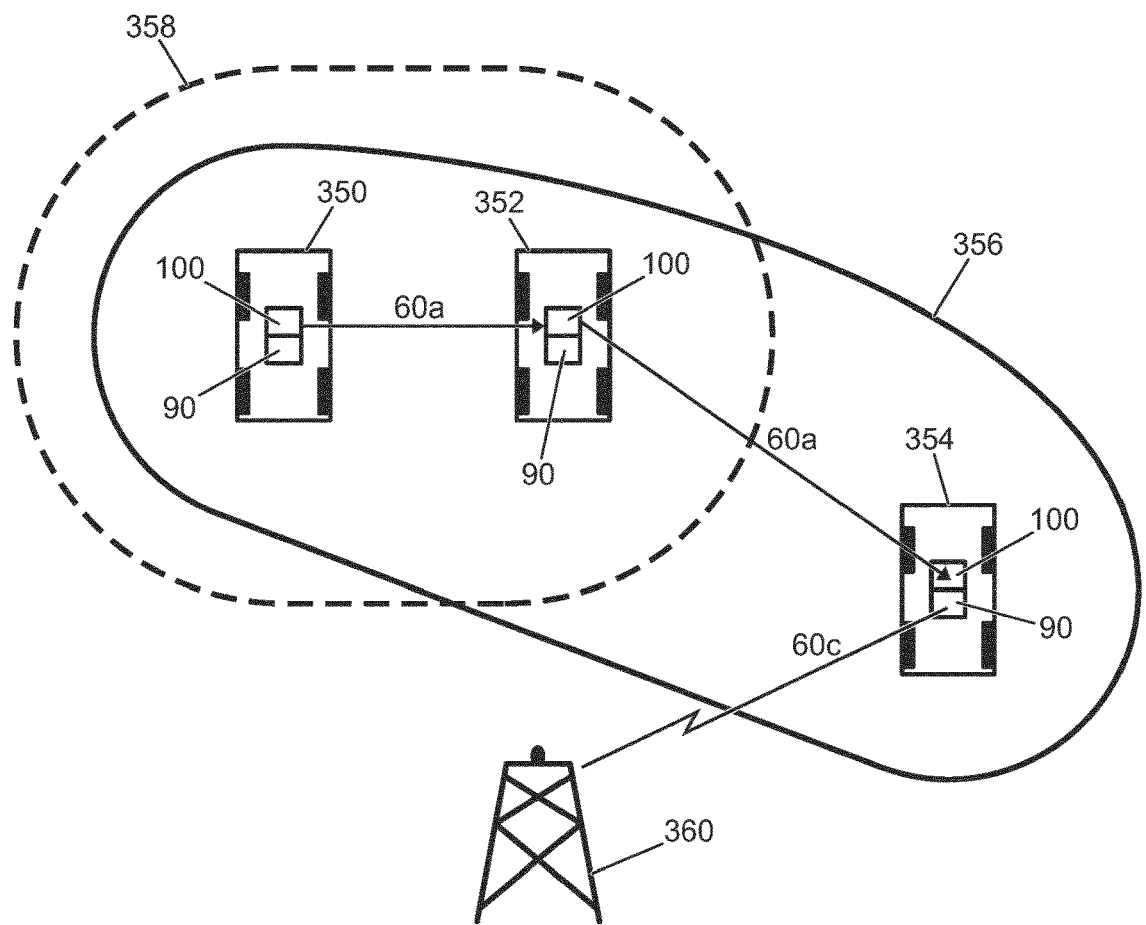
FIG. 6 shows a message broadcasting method according to a further embodiment of the present invention.

FIG. 6 shows a message broadcasting method according to a further embodiment of the present invention. As shown in FIG. 6 there are three vehicles 350, 352 and 354 each of which comprises a dedicated short range communication module 100 and a mobile device 90. The three vehicles are part of a convoy 356. Vehicles 350 and 352 are located in an area 358 in which a connection to the mobile telecommunications tower 360 is not possible (e.g. because the vehicles are off-road in an area with limited mobile phone reception).

Vehicles 350, 352 and 354 may send and receive convoy data messages according to the methods described above. Communications paths 60a using dedicated short range communications systems 100 may be established between all three vehicles shown in FIG. 6. Additionally, vehicle 354 may establish a mobile telecommunications path 60c with the mobile telecommunications tower 360 using its mobile device 90.

Convoy data messages exchanged between the various vehicles may comprise a portion of the message payload that provides status updates of the available communications channels on each vehicle.

For example, vehicles 350 may send convoy data messages in which a portion of the message payload delivers the following status: [DSRC—available]; [LTE—offline]. A similar convoy data message may be sent from vehicle 352. Vehicle 354 may send the status: [DSRC—available]; [LTE—available].

Since the convoy data messages from one vehicle are either sent directly to each other vehicle or are relayed to other vehicles (e.g. by hopping from one vehicle to another or by being sent to and from a mobile communications network) each vehicle in the convoy 356 is aware of the communications status of each other vehicle.

In the event that vehicle 350 needs to send a message via the mobile telecommunications network, e.g. because it is broken down, it is not possible to send such a message directly from vehicle 350 as it is in the area 358 and so has no mobile reception.

It is however possible for vehicle 350 to send a convoy data message to vehicle 352 with a request to forward the message to vehicle 354 for onward transmission to the mobile network 360.

Figure 7:
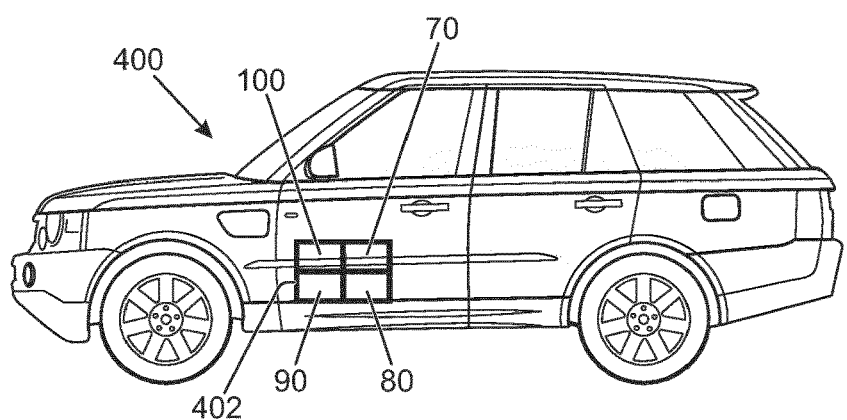
FIG. 7 shows a vehicle in accordance with embodiments of the present invention.

FIG. 7 shows a vehicle 400 comprising a vehicle convoy management system 402 comprising a computer application 70, mobile phone application 80, mobile device 90 and an intelligent travel system communication module 100.

Many modifications may be made to the above examples without departing from the scope of the present invention as defined in the accompanying claims.

The invention claimed is:

1. A message broadcasting method from a first vehicle within a vehicle convoy, the method comprising:
    receiving, via a first communications channel, a convoy data message from a second vehicle in the vehicle convoy, the convoy data message comprising a communication status indication providing an indication of the various communication channels available to the second vehicle within the convoy;
    determining, at the first vehicle, that a second communication channel is unavailable;
    analyzing, at the first vehicle, the received convoy data message to identify the availability of the second communications channel in the second vehicle in the convoy; and
    sending, from the first vehicle, a convoy data message via the first communications channel with a request that the convoy data message is to be forwarded from the second vehicle using the second communications channel.

2. A method as claimed in any claim 1, wherein the convoy data messages comprise vehicle data from a communications network within the first or second vehicle.

3. A method as claimed in claim 1, wherein the convoy data messages comprise vehicle configuration settings for the first vehicle.

4. A method as claimed in claim 3, wherein the vehicle configuration settings comprise wade data.

5. A method as claimed in claim 4, wherein the wade data comprises the depth of recent wading events.

6. A method as claimed in claim 4, wherein the vehicle configuration settings comprise the wading configuration of the first vehicle.

7. A method as claimed claim 3, wherein the vehicle configuration settings comprise terrain mode configuration settings.

8. A method as claimed in claim 1, wherein the convoy data messages comprise one or more selected from: terrain response configuration of the first vehicle; control speed data of the first vehicle; control speed variation data of the first vehicle; wade data; wheel articulation data; wheel slip data; GPS data; and tire pressure data.

9. A method as claimed in claim 1, wherein the convoy data messages comprise multimedia content.

10. A method as claimed in claim 1, wherein the first vehicle broadcasts a vehicle status message, the status message comprising a standard element for notifying surrounding environment of status of vehicle and a customized element, the customized element comprising the convoy data message.

11. A method as claimed in claim 1, comprising sending convoy setup invitation messages to and receiving confirmation messages from a plurality of vehicles.

12. A method as claimed in claim 1, wherein the vehicle convoy is an off road convoy and the convoy data messages comprise data relating to off road driving.

13. A message broadcasting system from a first vehicle within a vehicle convoy, the system comprising:
    an electronic processor having an electrical input arranged to receive, via a first communications channel, a convoy data message from a second vehicle in the vehicle convoy, the convoy data message comprising a communication status indication providing an indication of the various communication channels available to the second vehicle within the convoy; and
    an electronic memory device electrically coupled to the electronic processor and having instructions stored therein;
    wherein the electronic processor is arranged to access the at least one electronic memory device and execute the instructions stored therein so as to determine, at the first vehicle, that a second communication channel is unavailable and to analyze, at the first vehicle, the received convoy data message to identify the availability of the second communications channel in the second vehicle in the convoy; and
    wherein the system comprises an electrical output arranged to send, from the first vehicle, a convoy data message via the first communications channel with a request that the convoy data message is to be forwarded from the second vehicle using the second communications channel.

14. A vehicle comprising a message broadcasting system from a first vehicle within a vehicle convoy according to claim 13.

* * * * *